United States Patent [19]

Silvestrini et al.

[11] 4,323,619
[45] Apr. 6, 1982

[54] COVERING ELEMENT SCREENING OFF THE SOLAR RADIATION FOR THE APPLICATIONS IN THE REFRIGERATION BY RADIATION

[75] Inventors: Vittorio Silvestrini, Naples; Mario Peraldo, Milan; Enrico Monza, Nerviano (Milan), all of Italy

[73] Assignee: Montedison S.p.A., Milan, Italy

[21] Appl. No.: 59,598

[22] Filed: Jul. 23, 1979

Related U.S. Application Data

[63] Continuation of Ser. No. 869,279, Jan. 13, 1978, abandoned.

[30] Foreign Application Priority Data

Jan. 17, 1977 [IT] Italy ................................ 19361 A/77

[51] Int. Cl.$^3$ ................... B32B 7/00; B32B 5/16; B32B 27/08; F25B 27/00
[52] U.S. Cl. ...................... 428/212; 62/DIG. 1; 62/235.1; 428/207; 428/216; 428/323; 428/328; 428/330; 428/338; 428/409; 428/516; 428/913
[58] Field of Search ................ 62/2, 467 R, DIG. 1; 428/206, 207, 212, 215, 216, 323, 334–336, 338, 339, 500, 516, 913, 328, 330, 337, 409

[56] References Cited

U.S. PATENT DOCUMENTS 3,154,139  10/1964  Hager ............................. 62/DIG. 1
3,551,284  12/1970  Portolani et al. ................... 428/516

*Primary Examiner*—Bruce H. Hess

[57] ABSTRACT

Covering element having selective optical properties, suited as a protective screen for refrigerating devices by radiation, consisting of at least one film or sheet of a material, transparent to infrared radiation comprised between 8 and 13μm, and selected among polyethylene and ethylene copolymers, additioned with coloring materials selected among pigments and dyes so as to make this film reflecting in a prevailingly diffusive way (white) on the face to be turned to the direct solar radiation and absorbent, that is dark, for wave lengths below 3μm on the opposite face, said film thus additioned showing a mean weighted reflectance in the solar spectrum greater than 0.6 on the upper face exposed to the sun and less than 0.3μm on the opposite face, as well as a mean weighted transmittance in the solar spectrum not exceeding about 0.1.

7 Claims, 1 Drawing Figure

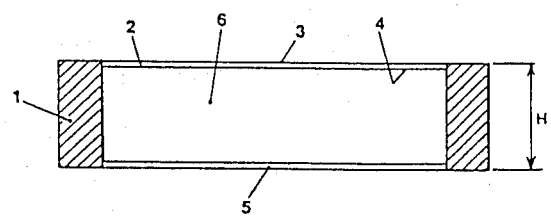

COVERING ELEMENT SCREENING OFF THE SOLAR RADIATION FOR THE APPLICATIONS IN THE REFRIGERATION BY RADIATION

This is a continuation of application Ser. No. 869,279 filed Jan. 13, 1978, now abandoned.

THE PRIOR ART

The known devices that achieve refrigeration by the means of selective irradiation, are based on the principle according to which an object exposed to the sky refrigerates itself when it has a surface with a high reflecting power in the visible and in the infrared field, with the exception of the 8-13 $\mu$m wave length field in which, on the contrary, is required a high absorbent power and, thus, also a high emissive power. With these selective optical properties said surface radiates continuously into space a thermal energy comprised within the 8-13 $\mu$m range, that is, through a so-called "atmospheric transparency window".

It is also known that the net power that an irradiating refrigeration device can deliver, is limited by the losses due to: conduction, convection and radiation into the surrounding space.

The mentioned first two losses are minimized by the use of a suitable insulation from the surrounding space, which for the part turned towards the sky foresees a covering having a high transparency falling within the 8-13 $\mu$m range, and whose function is essentially that of providing an insulating layer of stagnant air, without reducing, however, substantially the radiation cooling of the selective surface below.

The devices of this type, in practice, yield satisfactory results when they are exposed to a clear night sky. During the day they cool down less effectively, provided they are protected against direct solar radiation by means of a cover that shall not appreciably screen off the sky; on the contrary, they may even warm up if exposed to direct solar radiation.

Such loss of diurnal efficiency is due to the fact that the direct and/or diffused solar radiation is partially absorbed by the radiating surface which is not, or when it is not, perfectly mirror-like.

THE PRESENT INVENTION

The present invention relates to a covering element, screening off the solar radiation, suited for being used as a protective screen for refrigeration devices operating by radiation and/or for shading objects from solar radiation without hindering the radiating self-cooling. The invention is particularly but not exclusively suited for optimising the refrigeration performances, achieved by the radiation of selective surfaces.

One of the objects of this invention is that of providing a special covering element for such refrigerating devices, capable of eliminating almost completely the detrimental effects of the incident solar radiation, thus allowing a high refrigeration efficiency also at full exposure to the sun of the device itself, and this over the whole stretch of a 24-hour day.

Still another object of this invention is that of providing a covering also for non-selective radiators, that is, having an averagely high emitting power over the whole infrared spectrum and, possibly, also in the solar spectrum.

In fact, the covering element object of this invention, when used as a cover for any kind of surrounding containing for instance persons, animals and objects, will allow their self-cooling by radiation in as much as they themselves have the function of a radiator, not necessarily selective. In other words, the invention used as a covering for a certain space is capable of causing in the enclosed space the establishment of a temperature that is lower than the outside temperature.

A still further object of this invention is that of providing a protective screen (or covering) of any desired size and provided with all the possible ornamental and aesthetical motives, compatible with the preservation of its own peculiar optical properties required for its use as a shading cover or awning in the refrigeration of open spaces, such as for instance for sports, tourist or other purposes. In such a case in the zone below or underneath the covering or awning there establishes itself a a condition of thermal well-being (comfort) due to the lowering of the radiant temperature, which in its turn causes a lowering of the actual temperature even when there is a circulation of external air.

The protective screen suited for the above said objects must be transparent to the infrared radiation comprised by the wave-length range of 8-13 $\mu$m, while it shall not be transparent to the solar radiation whose wave length is lower than about 3 $\mu$m (mean weighted transmittance on the solar spectrum lower than about 0.1).

The cover according to this invention consists of a two-color film or awning and, since it has been established that this film should have a low transparency to solar radiation, the performances, with reference to the previously cited applications, depend on the reflectance that said cover opposes to solar radiation on its two opposite faces. The film surface turned towards the sky should show a total solar reflectance (specular and diffused) that is the highest possible, preferably greater than 0.6 (weighted mean on the solar spectrum); in the contrary case, the absorbed solar radiation and the transmitted one partly annul the effects of the refrigeration however produced.

On the face turned towards the radiator, especially when this one is a selective radiator, the film shall be preferably absorbent (mean solar adsorptance greater than 0.7, i.e. 70%) in order to allow that the fraction of solar radiation, which passed through the screen thanks to its partial transparency and which was reflected by the radiator, may be absorbed prevailingly by the protective screen itself instead of by the radiator due to the effect of a multi-reflection process.

Once this has been established, a covering element suited for the purposes previously specified, that is, an element provided with the cited selective optical properties, consists, according to this invention, of at least one film or sheet of a material transparent to infrared radiation comprised within the wave length range of 8-13 $\mu$m, preferably made of polyethylene and/or ethylene copolymers, additioned with pigments and/or dyes so as to make it reflectant in a prevailingly diffused way (white) on the face to be turned towards the direct solar radiation, and absorbing (i.e. dark) for wave lengths of less than 3 $\mu$m on the opposite face, this thus additioned film developing a mean weighted reflectance in the solar spectrum greater than 0.6 on the upper face turned towards the sun, and less than 0.3 on the opposite face, as well as a mean weighted transmittance in the solar spectrum not greater than about 0.1.

More particularly, said covering element, suited for being used as a protective screen for selective and non-selective radiators, is preferably formed of two coupled films of polyethylene and/or ethylene copolymers, of which one is white and contains at least one white pigment selected amongst: $TiO_2$, CaO, MgO and ZnS, in ponderal ratios comprised between 2% and 20% for a film of about 25–100 μm thickness, while the second one is black and contains at least one dye or pigment selected between cobalt oxide and carbonblack, the cobalt oxide being foreseen in ponderal ratios comprised between 1% and 5% for films of about 25–100 μm, while the carbonblack is present in ponderal ratios between 0.1 and 0.5% for films of about 25–100 μm, the concentration of said additives being chosen, case by case, with reference to the thickness of the film and to the granular size of the pigments used, so as to obtain the desired optical properties.

Practically, it has been found that the material transparent to infrared radiation that is most suited to form said protective screen according to the invention, is high-density polyethylene suitably additioned; in fact this polymer has the proper optical properties since it has an adsorption in the 8–13 μm range of between 10% and 15% on films of 100 μm thickness. Also the low density polyethylene has proved suited for the purposes of the invention even though, in this case, the absorption is 15–20% on 100 μm thick films.

As far as the additives to be used are concerned, after a number of tests it has been established that for the white, the most convenient and suitable substance is $TiO_2$ in all its morphological forms. The other cited compounds and other compounds of analogous characteristics may be used for these and other particular applications choosing suitably, the proper thickness concentration and granulometries.

As far as the black additive is concerned, cobalt oxide and carbon black have given excellent results. On films additioned with any type of carbon black coming from the known "channel", "furnace" or "thermal" processes there have been ascertained practically similar optical properties.

With regard to the granulometry of said pigments, it has been ascertained that the particle sizes are prevailingly lower than 5–8 μm, but not too much so as not to appreciably reduce the degree of diffusion in the solar spectrum or to involve packing problems in the preparatory phase of the film. On the contrary, the strongly absorbent pigments may also have granulometrics considerably below the values cited above, since it is not necessary that they be diffusive.

In practice, excellent results (very close to the theoretical forecast) have been achieved by coupling together two 50 μm thick films, one of which was whitened with the addition of rutile $TiO_2$ (mean granular size 0.3 μm) in a ponderal ratio comprised between 5% and 10%, and the other blackened with the addition of from 2% to 8% by weight of $Co_2O_3$ (mean granular size 3 μm), or with from 0.2% to 0.8% by weight of carbon black of the MT type, having a standard granulometry of 0.5 μm obtainable by the known "thermal" process (see Kirk, Othmer—Encyclopedia of Chemical Technology—Vol. 4—Intersc. Publ.—1964).

For the realization of said coupled films one may use any of the known methods such as for instance: by separately extruding or pressure molding the two differently colored films and by then coupling them together with glue or under heat pressure; by the simultaneous extrusion-blowing of two films one inside the other (co-extrusion) and by simultaneous lamination of the two films under dynamic conditions (extrusion coating).

According to a variant falling within the scope of this invention, said optically selective covering element may be obtained starting from one single white polyethylene film, by colouring one face black (either by painting, spraying, sedimentation, etc.) or, vice versa, from one single transparent polyethylene film by painting white (either by painting, spraying or the like) one face and in black (or at any rate in a dark color) the opposite face; or also by coloring only one face first in white and then on the white layer painting on a black layer or vice versa, without thereby altering the functions of the colorings which, as already indicated, serve to render the films reflecting in a prevailingly diffused way to direct or diffused solar radiation and to make it absorbent of the same radiation on the opposite face.

The use of a coupled screen of the above considered type (i.e.: prevailingly reflective in a diffused way upwards, absorbent downwards) allows to maintain a high transparency within the 8–13 μm range and at the same time a high reflectance and a low transparency in the solar spectrum, this bringing with it a slight warming up (and consequently lower thermal losses towards the radiator): moreover, especially when the radiator is selective, it allows to maintain the transmission of the screen in the solar spectrum rather high (and therefore also between 8 and 13 μm) because the fraction of solar energy transmitted by the screen and reflected back by the radiator, is prevailingly absorbed by the dark surface of the overhanging screen itself instead of by the radiator itself as would occur, on the contrary, in consequence of a process of multiple reflections between the radiator and a screen of the same transmittance that would be also very reflectant downwards.

According to another variant, still falling within the scope of this invention, even though with less satisfactory results, said selective screen may consist of a polyethylene film additioned with a mixture of white and black pigments, in suitable proportions, in as much as also in this instance the film will always prove transparent in the atmospheric window and little transparent in the solar spectrum where it reflects in a prevailingly diffused way and is absorbent.

In order to more clearly illustrate the preceding description of the invention, in the following are given some examples of practical embodiments of optically selective covering elements according to the invention, examples which are given for purely indicative and not limiting purposes.

EXAMPLE 1

A low-density polyethylene film of a total thickness of about 100 μm and suited for the building of a selective screen for refrigerators, was obtained in the following way:

a white polyethylene film, containing 7.5% by weight of rutile $TiO_2$ (mean granulometry 0.3 μm) and 50 μm thickness, was prepared by die-casting. In order to obtain a perfect dispersion of the pigment it is preferable to prepare apart a polyethylene mix with 40% of pigment and then admix to the polymer to be extruded such a percentage of that mix so that the pigment in the film shall equal the above specified percentage;

following the same procedural method, a black polyethylene film 50 μm thick and containing 3% by weight of $Co_2O_3$ (with a mean granulometry of 3 μm) was prepared, preferably pre-dispersing the pigment in a polyethylene mix just as for the white film;

then it was proceeded to couple under heat and pressure the two films thus previously prepared, so as to get a bicolor film with a total thickness of about 100 μm.

The coupled film thus obtained showed the following optical properties:

| White side | solar transmittance | 0.10 |
|---|---|---|
| | solar reflectance | 0.70 |
| | IR transmittance (8–13 μm) | 0.74 |
| Black side | solar transmittance | 0.11 |
| | solar reflectance | 0.10 |
| | IR transmittance (8–13 μm) | 0.75 |
| (The IR transmittance (8–13 μm) of the starting film (100 μm) was | | 0.80) |

(By the terms: solar transmittance and solar reflectance herein above and in the following examples is respectively meant the "weighted mean" on the respective transmittance and reflectance values of the solar spectrum).

The bicolored film thus obtained was used as a covering (protective screen) for a selective refrigerating device of the type schematically represented in the FIGURE wherein a supporting frame 1 of semirigid foamed polystyrene with a high II equal to 10 cm carried on top of it the bicolored protective screen 2 of 100 μm of total thickness, obtained as above specified and showing a white upper face 3 and a black lower face 4. To the bottom of the frame 1 was fitted a selective radiator 5 consisting of a carrier plate with the upper face coated with a 12.5 μm polyvinylfluoride film whose underlying surface had been made specular (mirror-like) by metallization (alumination or otherwise).

The frame, screen 2 and radiator 5 define the enclosed area 6.

For the evaluation of the refrigeration performance of said device, having a useful radiant surface of 1 m², in contact with the radiator was placed underneath it a vessel thermically insulated with an insulating 20 cm thick layer of foamed polystyrene, said vessel containing about 15 liters of water.

Under clear sky conditions, in a seaside resort at sea-level, within 24 hours the water in the vessel attained a temperature of around 17° C. (varying between a minimum of about 15° C. during the night and a maximum of about 19° C. during the day), while the ambient temperature varied between about 16° C. during the night and 28° C. during the day, in the shade.

EXAMPLE 2

A high density polyethylene film, with a final thickness of about 100 μm, was obtained directly by lamination in a double layer (thickness of each layer 50 μm) using as white component the same TiO₂ of example 1 in a concentration of 7.5% by weight, and as the black component, the carbonblack of the MT type (mean granulometry 0.5 μm)—instead of the cobalt oxide—in the proportion of 0.3% by weight.

The optical characteristics of the bicolor film thus obtained were:

| White side: | solar transmittance | 0.08 |
|---|---|---|
| | solar reflectance | 0.65 |
| | IR transmittance (8–13 μm) | 0.78 |
| Black side: | solar transmittance | 0.09 |
| | solar reflectance | 0.09 |
| | IR transmittance (8–13 μm) | 0.78 |

The 100 μm thick starting film (i.e. film without color components) showed an IR transparency, within the 8–13 μm range, of 0.85. This bicolor film proved particularly suited for the use as covering of self-refrigerating panels of the type described in example 1. With such panels there was built a cold store with a base area of 4 sq.mt. which was then filled with about 240 lt of H₂O at mean room temperature. After 4 days, although under unfavorable weather conditions because of frequent cloudiness and haze, the temperature inside the cold store, still in a decreasing stage, showed a drop of 10°–12° C. with respect to the maximum outside temperature, and about 2°–3° C. with respect to the minimum nightly temperature (about 8°–9° C. below the maximum day-temperature). Already after little more than 36 hours the inside temperature maintained itself below the minimum night-temperature over the whole run of 24 hours.

EXAMPLE 3

A bicolor film of total thickness of 100 μm was obtained by coupling a white, 75 μm thick high density polyethylene film with a black, 25 μm thick low density polyethylene film.

The white film was prepared by additioning, according to the method indicated in example 1, high density polyethylene with a TiO₂ pigment in a ponderal percentage of 5%, while the black film is obtained by adding to the low density polyethylene 8% by weight of cobalt oxide.

The film, coupled according to the known technologies, showed the following optical properties:

| White side: | solar transmittance | 0.08 |
|---|---|---|
| | solar reflectance | 0.70 |
| | IR transmittance (8–13 μm) | 0.78 |
| Black side: | solar transmittance | 0.08 |
| | solar reflectance | 0.10 |
| | IR transmittance (8–13 μm) | 0.78 |

With the film obtained according to this example there was prepared a shading device for large ventilated areas, that is, a framework shed without perimetral enclosures, having as a roof only the above described film. It was found that the physiological sensation under said screen was of greater coolness than that produced by a traditional opaque awning in the atmospheric window. This effect is due to the drop of the mean radiant temperature and is known as "reverse hothouse effect".

EXAMPLE 4

A high density polyethylene bicolor film, with a final thickness of about 50 μm, is obtained by following the procedures described in example 2. This film turned out to consist of two uniform layers of equal thickness but differently colored.

The white component consisted of 14% by weight of rutile TiO₂, while the black layer consisted of 0.6% by weight of carbon black of the MT type. The granulometry of the indicated additives is the same indicated in the cited example.

The optical characteristics of the bicolor film were:

| White side: | solar transmittance | 0.09 |
| --- | --- | --- |
| | solar reflectance | 0.67 |
| | IR transmittance (8–13 μm) | 0.82 |
| Black side: | solar transmittance | 0.11 |
| | solar reflectance | 0.09 |
| | IR transmittance (8–13 μm) | 0.83 |

EXAMPLE 5

A high density polyethylene bicolor film, with a final thickness of about 200 μm, was obtained by following the procedures of example 2. The film turned out to consist of two uniform layers of the same thickness but of a differently colored material.

The white component consisted of 4% by weight of rutile $TiO_2$, while the black side consisted of 2% by weight of $Co_2O_3$. The mean granulometry of the mentioned additives amounts respectively to about 0.3 μm and 3 μm.

The optical characteristics of the bicolor film were:

| White side: | solar transmittance | 0.08 |
| --- | --- | --- |
| | solar reflectance | 0.72 |
| | IR transmittance (8–13 μm) | 0.66 |
| Black side: | solar transmittance | 0.08 |
| | solar reflectance | 0.09 |
| | IR transmittance (8–13 μm) | 0.66 |

EXAMPLE 6

A grey, high density polyethylene film about 100 μm thick, and containing in admixture 7.5% by weight of rutile $TiO_2$ (mean granulometry=0.3 μm) and 0.05% by weight of carbon black of the MT type, was obtained by extrusion-blowing.

Such a film showed the following optical properties:

| solar transmittance | 0.01 |
| --- | --- |
| solar reflectance | 0.43 |
| IR transmittance (8–13 μm) | 0.48 |

It the above quoted examples there have been realized bicolor films of different thicknesses, but also films with greater or lesser thicknesses may be produced according to this invention. In fact, although the radiating efficiency in the atmospheric window of the radiator proved progressively reduced in consequence of the greater absorption typical of the polyethylene film in the 8–13 μm range with the growing of its thickness, the covering may be obtained also in rather greater thicknesses (than those of the examples), for particular mechanical, aestetical and other requirements, provided that the concentration of the additives be adequately reduced so as to maintain approximately constant the product of thickness×concentration of each additive. Analogously, the thicknesses may be even further reduced.

As far as practical applications are concerned, with the colored films according to the invention there may be produced various types of covering elements (awnings), either horizontal or slanting covers. In fact, while they allow the solar radiation to enter the underlying zone only for a reduced and wanted fraction, they permit on the other hand the flowing out of the infrared radiation. As a consequence thereof, under said coverings or awnings there establishes itself an actual temperature that is lower than the temperature that would be experienced under the same conditions of light and with conventional awnings, and even lower than the ambient temperature, wherefore it will be possible to realize a natural conditioning of wide areas (reverse hothouses). That is, it will be possible to shade sporting grounds or tourist places as well as protect agricultural cultivations and the likes. When, moreover, said cool shadow awnings are arranged in a loose contact to cover foodstuffs (e.g. fruits, vegetables, etc.) which would be perishable in the open, they would keep these foodstuffs at a temperature that will be lower than the room temperature and thus delay the deterioration of such foodstuffs.

More particularly, said colored awnings may be used also for realizing inflatable and non-inflatable sheds, as well as for building effective protections for tanks for volatile and/or inflammable materials. Moreover, said awnings may also be produced with reinforcing ribs and with various ornamental patterns so as to be suitably used for shading environments in a tone matching the furnishings of said spaces.

The colored film, obtained according to this invention, finds a very effective application in the realization of refrigerating radiating devices capable of working in full sun, that is, devices that besides consisting of a carrying frame (in insulating material) and of a selective radiator of the known type (as previously specified), like the usual selective refrigerators, are in this case closed on the top by a colored screen according to the invention.

With the application of these colored protective screens, said refrigerating devices cool down by 10°–20° C. when exposed to the sun and thus find a useful application in the conditioning of rooms or in the realization of proper refrigerators or cold stores capable of working both during the day as well as during the night for the most various uses. Obviously, to the herein above described invention may be introduced modifications and variants that are structurally and functionally equivalent without falling outside the spirit and scope of the invention itself.

What we claim is:

1. A flexible covering element having selective optical properties and useful as a protective screen for refrigerating devices which provide refrigeration by selective irradiation, said covering consisting of at least one film or sheet having a thickness of from 25 to 100 μm and formed of a material which is transparent to infrared radiation in a range of light wavelengths comprised between 8 and 13 μm and selected from the group consisting of a polyethylene and ethylene copolymers, said film or sheet also containing additives which are coloring adjuvants selected from the group consisting of pigments and dyes and which render the sheet or film reflecting in a prevailingly diffusive way (white) on the face thereof to be turned to the direct solar radiation and absorbent (dark) for wavelengths lower than 3 μm on the opposite face, said film containing the additives showing a mean weighted reflectance in the solar spectrum greater than 0.6 μm on its face to be exposed to the sun and of less and 0.3 μm on its opposite face, and being further characterized in having a mean weighted transmittance in the solar spectrum not exceeding about 0.1.

2. Covering element according to claim 1, wherein said differently colored films are made of high density polyethylene and each one is about 50 μm thick.

3. Covering element according to claim 1, wherein said white colored film is a film of polyethylene about 75 μm thick, while the black film is a film of polyethylene of about 25 μm thickness.

4. Covering element according to claim 1, wherein the white pigment is rutile titanium dioxide and, the black coloring material is cobalt oxide or carbon black.

5. Covering element according to claim 1, in which said pigments have a mean granule size below the range 5–8 μm.

6. Covering element according to the claim 1, in which the coloring materials are incorporated, in admixture with each other, in the starting polyethylene film so as to obtain a film that is substantially grey on both faces and has the desired optical properties.

7. A flexible covering element having selective optical properties, being useful as a protective screen for refrigerating devices which provide refrigeration by selective irradiation, said covering element consisting of a film which is transparent to infrared radiations in a range of light wavelengths comprised between 8 and 13 μm, consisting of two films coupled to each other and each formed of a polymer selected from the group consisting of polyethylene and ethylene copolymers, one of said films being white and containing at least one white pigment of granule size lower than 8 μm and selected from the group consisting of $TiO_2$, CaO, ZnS and MgO in a weight ratio comprised between 2% and 20% for films having a thickness of about 25 to 100 μm, and the other of said films being black and containing at least one coloring adjuvant which is a dye or pigment of granule size lower than 3 μm and selected from the group consisting of cobalt oxide and carbon black, the cobalt oxide, if present, being present in a weight ratio of between 1% and 5% for films having a thickness of about 25 to 100 μm, and the carbon black, if present, being in a weight proportion of between 0.1% and 0.5% for films having a thickness of about 25–100 μm, the concentration of total additives in the films depending on the thickness of the film and the granule size of the pigments and dyes used, and selected to result in the desired optical properties.

* * * * *